United States Patent
Shi

(10) Patent No.: US 8,505,840 B2
(45) Date of Patent: Aug. 13, 2013

(54) METHOD FOR MODIFYING NOMAL CLAY AND A METHOD FOR PRODUCING COMPOSITE ELASTOMER FROM THE CLAY

(76) Inventor: Lei Shi, Guangdong (CN)

( * ) Notice: Subject to any disclaimer, the term of this patent is extended or adjusted under 35 U.S.C. 154(b) by 947 days.

(21) Appl. No.: 12/451,321

(22) PCT Filed: Aug. 20, 2007

(86) PCT No.: PCT/CN2007/002514
§ 371 (c)(1),
(2), (4) Date: Nov. 6, 2009

(87) PCT Pub. No.: WO2008/134917
PCT Pub. Date: Nov. 13, 2008

(65) Prior Publication Data
US 2010/0098495 A1   Apr. 22, 2010

(51) Int. Cl.
*B02C 1/00* (2006.01)
*B02C 19/00* (2006.01)
*B02C 21/00* (2006.01)

(52) U.S. Cl.
USPC .................................. 241/21; 241/22; 241/23

(58) Field of Classification Search
USPC ..................................... 241/21–23
See application file for complete search history.

(56) References Cited

U.S. PATENT DOCUMENTS

| | | | |
|---|---|---|---|
| 5,303,871 A * | 4/1994 | Bateson et al. | 241/20 |
| 6,601,787 B1 * | 8/2003 | Langenecker | 241/21 |

* cited by examiner

*Primary Examiner* — Faye Francis
(74) *Attorney, Agent, or Firm* — Raymond Y. Chan; David and Raymond Patent Firm

(57) ABSTRACT

A method for modifying soil and a method for producing composite Elastomer of the soil are disclosed. The method for modifying soil includes drying, pulverizing, sieving, and purifying the soil to obtain soil powder, then dynamically heating the powder and adding surfactant, which includes coupling agent, polysiloxane having reactive functional, emulsifier of organosilicon and aliphatic amine, and water, and then drying the above obtained powder to obtain modified soil. The modified soil and acrylic acid copolymer emulsion are mixed with plasticizer, foaming agent, etc. to form a composite body which is used to produce elastomer floor board, elastomer wall brick, composite soil skin material, and so on. No emission of toxic gas and evaporation of organic solvent can be attained during production and use of the invention, and performance of the product is same as or has superiority over rubber in compression deformation rate, rebound elasticity and durability.

11 Claims, 2 Drawing Sheets

METHOD FOR MODIFYING NOMAL CLAY AND A METHOD FOR PRODUCING COMPOSITE ELASTOMER FROM THE CLAY

BACKGROUND OF THE PRESENT INVENTION

1. Field of Invention

The present invention relates to a polymer composite and the producing method thereof, and more particularly to a method for modifying soil to produce composite elastomer.

2. Description of Related Arts

It is common that in the process for producing plastic, rubber, paint, or cables, fillers are generally added into the raw materials of the compound to reduce the costs and improve the physical properties of the raw materials. The key point is to find out the relations between the fillers and the organic compounds, so as to maximize the physical properties or to minimize the cost for producing the compounds. The soil is one of the cheapest fillers that can be found everywhere. At present, non-metallic mineral soil is one of the most common fillers for adding into the producing process, such as kaolin, attapulgite, bentonite, clay, and coal gangu. How to add the non-metallic mineral soil in the producing process without affecting or decreasing the physical properties of the materials is the focus of the research for the synthesizing process. There are some publications introducing the characteristics of modified non-metallic soil as followings.

1. Title: The Affection of Modified Calcined Kaolin on the EPDM's Function. Author: ShuZhan, Y E; YanHao, ZHOU; FuLin, CHEN. Institution: Materials and Energy College, GuangDong University of Technology. Journal: *China Rubber Industry*, 2006, 53(12).-723-726. Summary: A silane coupling agent is used for surface-modification of calcined kaolin, wherein the study of variety and amount of silane coupling agents on the calcined kaolin EPDM plasticity properties is conducted. The results show that silane coupling agent has a minor effect on the burn time and vulcanization time of the calcined kaolin substance EPDM plastic. The coupling agent, A17Z, has a more significant modifying effect and is able to enhance the tear strength of the EPDM vulcanization. The excessive amount of coupling agent A17Z is used, it will reduce the solvent-ability of EPDM vulcanizate.

2. Title: The surface modification of Sedimentary calcined kaolin in Yichang and Its Application. Author: WangChi, ZHANG [1,2]; Ming'an, HU [1]; JinFa, LI [2]; YanBo, CHEN [2]. Institution: (1) Graduate School of China University of Geosciences (2) Yichang Institute of Geology and Minerals Resources. Summary: sedimentary kaolin is the unique resource of kaolin in China. The study shows that Yichang sedimentary kaolin, used as the substance of high performance electric cable, can significantly improve the physical properties of the electric cable after the sedimentary kaolin is being pulverized, calcined, grinded, and surface modified by the silane coupling agent.

3. Title: The Producing of A surface-modified attapulgite reinforced rubber. Author YuanSun, WANG. Institution: unknown. Journal: *China Rubber/Plastics Technology and Equipment*. Summary: The method for improving the compatibility and filler effect of rubber through the organically surface modifying of attapulgite clay, wherein the yield strength, 300% elongation, and tear strength are significantly increased. Thus, the vulcanization time is shorter, sulfide cross-linking effect is enhanced. This product is able to widely use for the high strength rubbers.

4. Title: The Feasibility Study on the Modified Dolomite Attapulgite Appling into Rubber Filling. Author YeLing, JIN; YunHua, QIAN. Institution: Chemical Engineering Department, Huaiyin Institute of Technology. Journal: *Journal of Nanjing University of Science and Technology (University of Science and Technology)*: 2005, 29(6).-720-723. Summary: The study disclosed the natural composite filling feasibility of modified Dolomite-Attapulgite in rubber, wherein the modified Dolomite-Attapulgite is mechanically tested and microstructure observed. The results show that the filling of plastic substance in the dolomite-attapulgite modified by the stearic acid is significantly increased, which can reach 110 g/100 g plastic substance, so as to have excellent compatibility, shorten the mixing time, enhance the elongation ability, smoothen and flatten the surface of the plastic substance, and enhance the glossness. Compared the modified dolomite-attapulgite with the precipitated calcium carbonate, dolomite-attapulgite can significantly improve the tensile strength of filled rubber-like, 300% elongation, elongation at break and adhesion strength, which are increased 57.8%, 100%, 5.5%, 16% respectively compared with light-filled plastic Ca sample.

5. Title: The Surface-modified Coal calcined kaolin and Its Application in Polymer Products. Author BaoZhi, LI[1]; WenLi, WANG[2]. Institution: (1) Rechi Surface Modifiers Factory in Baotou, Inner Mongolia Province (2) Technical Information of China Building Materials. Institution *Non-Metallic Mines*. 2005, 28(B09).-49-51. Summary: the article mainly introduced the nature of the coal-bearing series of kaolin, wherein it disclosed the application result after calcination the surface modification mechanism, methods, equipment selection, as well as the calcined soil in plastic, rubber, paint, etc.

6. Title: The Production of Bentonite/PAA superabsorbent material and Its Modification. Author: YueLin, W E I; JiHuai, W U; YunFang, HUANG. Institution: Huaqiao University. Journal: *Journal of Huqiao University (Natural Science)* 2005, 26(4).-365-368. Summary: High-temperature rapid solution polymerization method. Synthesis of bentonite/polyacrylate superabsorbent composite, wherein the study disclosed the variety affects during the preparation of composite material, such as the effect of cross-linking agent amount and ultra-fine powder amount on water absorption. The article also mentioned about modifying the surface of cross-linking composite materials. The results showed that the modified composite materials can help to improve water absorption and water absorption rate.

7. Title: Surface-modified Kaolin and Its Application in Rubber Cable. Author: XianZhong, CHENG[1]; Can, JIN[1]; XinHai, LIU[2]. Institution: [1] Yichang Institute of Geology and Mineral Resources [2] Zhengzhou Institute of Multipurpose Utilization of Mineral Resources. Journal: *China Powder Industry*. 2005(4).-34-37. Summary: The coal-bearing series of kaolin is China's unique kaolin resources. The study showed that the coal-bearing series of kaolin, through pulverization, Calcination, grind, and surface modification by the silane coupling agent, can be used as high physical properties of electric cable material, wherein the filling ability is significantly improved.

8. Title: The Surface-modified Attapulgite and Its Application in Boots Facial Plastic. Author: YunHua, QIAN; YeLing, J I N. Institution: Chemical Engineering Department, Huaiyin Institute of Technology. Journal: *Non-Metallic Mines*. 2005, 28(1).-17-18, 43. Summary: The Dolomite-Attapulgite is modified via the stearic acid, wherein the best condition for modifying is to use 2% stearic acid, at a modifying temperature of 80° C., and modifying time of 30 minutes, so that the activation index of the modified dolomite-attapulgite is about 0.95. The modified dolomite-attapulgite in the surface of the rubber made rain boot shows that the modified dolomite-attapulgite is able to completely replacing the light calcium.

9. Title: The Preliminary Study on The Surface modification of Nano-kaolin. Author: ZhuoQin, L I U; ZhenBang, P I; XiKe, TIAN. Institution: Faculty of Material Science & Chemistry Engineering, China University of Geosciences. Summary: Using variety of modifying agents for the surface modification of nano-kaolin, wherein the article discusses the mechanism of increasing the index via adding surfactant during the modification. Through the infrared analysis, the surface of the kaolin particle is linked with the coupling agent. The filling rubber test shows that the composite modified nano-kaolin has an excellent reinforcement effect.

10. Title: Study on the Surface modification of Sedimentary Kaolin and Its Application. Author: XinHai, L I U; YiBo, L I. Institution: Zhengzhou Institute of Multipurpose Utilization of Mineral Resources, Chinese Academy of Geological Sciences. Journal: *China Powder Technology.* 2005, 11(2).-6-8. Summary: The sedimentary kaolin is the unique natural source. The experiment shows that, used as the substance of good quality of electric cable, can significantly improve the physical properties of the electric cable after the sedimentary kaolin is pulverized, calcined, grinded, and surface modified by the silane coupling agent.

11. Title: Activation of Bentonite Modification and Its Application in Rubber. Author: LiYing, ZHAO; YinShan, JIANG. Institution: Jilin University. Journal: *Multipurpose Utilization of Mineral Resources.* 2004(2).-23-27. Summary: Use the method of heat treatment and mechanical-chemical modification of combining activated bentonite to prepare rubber reinforcing filler. The heat treatment can effectively reduce the volatile and integration of mineral water and activate structure to ensure and improve the effect of dry-mechanical-chemical surface modification, so that can obtain ideal index of using modifier less than 1%. The obtained bentonite by using this method can replace 30% of semi-reinforcing carbon black, and its physical properties of rubber products meet the national standard GB3778-94. If the high-abrasion furnace black is 100% replaced, the mechanical properties of the rubber can meet the GB318-98 Technical Requirements.

12. Title: Progress in Surface Modification of Kaolin. Author: XuHai, WANG; XuChen, L U. Institution: Energy and Materials Research Center of Institute of Process Engineering, Chinese Academy of Sciences. Journal: *Industrial Minerals and Processing.* 2004, 33(3).-1-3, 10. Summary: An overview of Research on Surface Modification of kaolin and modified kaolin applications, proposing future research directions.

13. China patent application, CN 200480036156. X. Title: preparation of Si rubber composition of kaolin. Applicant: Dow Corning Corporation. Address: Michigan, USA. Inventor: M•G•Proctor; R•M•Taylo. Date for entering national stage:

Jun. 5, 2006. Summary: Treatment of a kaolin containing silicone rubber composition, the composition essentially consists of the following components: an organic polysiloxane, processed kaolin; curing agent; and selected from one or more rheology modifiers, pigments, colorants, anti-adhesives, plasticizers, adhesion promoting agents, blowing agents, flame retardants and the desiccant in the optional additives. The composition is basically non-reinforcing filler. The final kaolin containing silicone rubber composition can be used, such as siloxane profile extrusion, wire and cable coatings, glass assembly and washers for structural purposes.

14. China patent application, CN 200410047914.X. Title: External fluorocarbon decorative coatings and manufacturing method. Applicant: China National Petroleum Corporation; China Petroleum Group, Engineering Technology Institute. Address: Shop Kang, Xicheng District, Beijing, No. 6, 6. Summary: The present invention relates to an external fluorocarbon decorative coatings and manufacturing method, which is heating, mixing, and grinding fluoride vinylidene fluoride water emulsion, hydroxyethyl cellulose, sodium polycarboxylate, alkyl phenol polyoxyethylene ether, polyether modified dimethyl polysiloxane, 2-amino-2-methyl-1-propanol, titanium dioxide, talc, kaolin, 2,2,4-trimethyl-1,3-pentanediol single-isobutyl ester, sodium polyacrylate, urethane-modified polyether, and fumed silica powder to form the coatings, which has the characteristic of environmental friendly of room temperature curing, wherein the coating membrane has excellent weather resistance, solvent resistance and stain resistance.

According to the above references, using a modifier to modify the non-metal mineral soil can produce a high compatibility with other polymer materials, shorten the mixing time, and significantly enhancing the yield strength, elongation rate, tear strength of the filling plastic material, rubber, paper, paints, or electric cable. However, there is no publications or reference of modifying normal soil (such as yellow soil, red soil, black soil, or white soil) to be used in inorganic filling material.

The elastomer products include elastomer sports flooring, elastomer wall and floor bricks, and synthetic leather etc. Most of the existing elastomer products are rubber or thermoplastic elastomer. The vulcanization process of rubber generates toxic gaseous, so as to harm the environment. The thermoplastic products have the physical properties of vulcanizate and the similar process performance of the soft plastic material. However, the thermal resistance thereof is not as good as rubber, so that when the temperature is increasing, the physical properties of the thermoplastic products are dramatically decreasing, so as to limit the applications thereof. Meanwhile, the compression deformation, recovery elasticity, and durability of the thermoplastic material are not as good as rubber. And its price is usually higher than rubber. The above elastomer has relied on chemical products. Even if using inorganic material as the filling or substance, the content of inorganic material is no more than 60%.

Recently, some references mentioned about using the acrylic ester as the raw material for making elastomer material. Below are some examples.

1. Title: The preparation of butyl acrylate copolymer elastomer and its properties. Author: SuLing Tong, YuanYou Li, XingHua Zhang; Institute: Materials and Energy College, GuangDong University of Technology; Journal: GuangDong Rubber 2004(7).-2-4. Summary: The article is about synthesizing butyl acrylate elastomer material, wherein the acrylonitrile and acrylic acid are added as comonomer for modifying. The product is tested for the hardness and the glass transition temperature. The results show that when the butyl acrylate is copolymerizing with acrylic acid and acrylonitrile, the hardness and glass transition temperature of the copolymer is increased corresponding to the increasing content of the acrylonitrile and acrylic acid, wherein the butyl acrylate has more significant effect on the hardness of the product.

2. Title: The method of preparation of porous PBA elastomer material of reverse concentrated emulsion. Author: HongJuan Chen, Chen Zhang, ZhongJie Du, HangQuan Li; Institute: Beijing University of Chemical Technology-Beijing Novel Polymer Materials and Processing Laboratory; Journal: China Synthetic Rubber Industry. Summary: Use the butyl acrylate as a monomer. Use the divinyl benzene as cross-linking agent. Use azobisisobutyronitrile as initiator agent, sorbitol anhydride monooleate as the emulsifier, and water as dispersed phase. Use the reversed-phase concentrated emulsion for preparing the bulb-hole structure of acrylic acid Ding Lu (PBA) elastomer materials and for studying the polymerization reaction temperature, amount of emulsifier, and the dispersed phase volume fraction of PBA elastomer material pore structure of foam, characterized by scanning electron microscopy of the foam pore structure. The results show that polymerization reaction temperature should be controlled to 50~60° C. As the emulsifier mass fraction from 10% to 30%, the size of the pore of PBA elastomer gradually decreases, and the number of channels between the pores is increased. As the dispersed phase increasing volume fraction, PBA elastomer material of the pore diameter and channel diameter, speed incremental large porosity increased, the density are decreasing.

The above references disclosed acrylate copolymer elastomer and thermoplastic elastomer rubber have been solved the disadvantages of the existence products and provide a new material of application field. However, the acrylic ester copolymer elastomer practical application to industry and everyday life has not been reported. The uses of the acrylic emulsion copolymer and modified soil to form the composite elastomer materials are also not been reported.

SUMMARY OF THE PRESENT INVENTION

An object of the present invention is to provide a method for modifying the soil and producing composite elastomer mainly from the modified soil and acrylic acid copolymer emulsion. There is no emission of toxic gas and evaporation of organic solvent during the process of producing the product of composite elastomer. The physical properties of the product of composite elastomer are the same or beyond the rubber in the compression deformation rate, elasticity, and durability. The final product containing 30 to 80% of soil is a low cost, high quality and performance product, and is relatively eco friendly elastomer material.

Accordingly, in order to accomplish the above objective, the present invention provides a method for modifying soil, which comprises the steps of: obtaining soil powders; kinetic heating the soil powders, adding a surfactant into the soil powders at a dynamic status thereof for surface modification of the soil powders; and drying the soil powders to obtain a predetermined amount of modified soil. Accordingly, the soil powders can be obtained by drying a predetermined amount of soil, pulverizing the soil, and sieving the soil to remove gravel and impurities of the soil. Alternatively, the soil powders can be obtained by mixing a predetermined amount of soil with water, sieving the mixture of soil and water to obtain a predetermined amount of mud, drying the mud, and pulverizing the dried mud to obtain the soil powders.

The principle of the present invention is that the surface of the normal soil adsorbs or chemically reacts with the functional groups of organic molecules, so that the surface of the soil is enveloped by the organic molecules, so as to change the physical and chemical properties of the soil to obtain the modified soil. The modified soil is dispersed into organic polymer material and formed a "molecular bridge" between the organic polymer and the soil particles. The function of the "bridge" is mainly depended on the surfactants. Accordingly, the surfactant is formed by mixing coupling agent, polysiloxane, emulsifier of organosilicon and aliphatic amine, and water, and is used in the present invention surface modification of the soil powders.

The surfactant generally comprises 0.6 to 6 mass portions of coupling agent, 1 to 12 mass portions of polysiloxane having one or more reactive functional groups, 0 to 2 mass portions of emulsifier of organosilicon, and the rest portions are water.

The above coupling agent is a silane coupling agent, such as modification of amino-silane coupling agent, silane coupling agent containing peroxide, diazo and azide with the structure of silane coupling agent. The molecular formula of the silane coupling agent is RsiXn, wherein Xn is hydrolysis group. Normally, the functional groups of alkoxy type form SiOH after hydrolysis.

The variety of silane coupling agents of the present invention is shown in below table.

| Functional group | Chemical name | Chemical structure |
|---|---|---|
| vinyl | vinyl trichloro silane | $Cl_3SiCH=CH_2$ |
|  | vinyl trimethoxy silane | $(CH_3O)_3SiCH=CH_2$ |
|  | vinyl triethoxy silane | $(C_2H_5O)_3SiCH=CH_2$ |
| epoxy group | β-(3.4-epoxy hexyl)ethyl trimethoxy silane | $(CH_3O)_3SiC_2H_4$—(cyclohexyl epoxide) |
|  | γ-[(2,3)-epoxypropoxy]propyl trimethoxy silane | $(CH_3O)_2SiC_3H_6OCH_2CH{-}CH_2$ (epoxide) |
|  | γ-[(2,3)-epoxypropoxy]propyl ethyl diethoxy silane | $(C_2H_5O)_2Si(CH_3)C_3H_6OCH_2CH{-}CH_2$ (epoxide) |
|  | γ-[(2,3)-epoxypropoxy]propyl triethoxy silane | $(C_2H_5O)_3SiC_3H_6OCH_2CH{-}CH_2$ (epoxide) |
| methyl acrylyl | 3-(methyl acrylyl)propyl methyl dimethoxy silane | $(CH_3O)_2Si(CH_3)C_3H_6OC(=O)C(CH_3)=CH_2$ |

| Functional group | Chemical name | Chemical structure |
|---|---|---|
| | 3-(methyl acrylyl)propyl trimethoxy silane | $(CH_3O)_3SiC_3H_6OCOC(CH_3){=}CH_2$ |
| | 3-(methyl acrylyl)propyl methyl diethoxy silane | $(C_2H_5O)_2Si(CH_3)C_3H_6OCOC(CH_3){=}CH_2$ |
| | 3-(methyl acrylyl)propyl triethoxy silane | $(C_2H_5O)_3SiC_3H_6OCOC(CH_3){=}CH_2$ |
| acrylyl | 3-(acrylyl)propyl trimethoxy silane | $(CH_3O)_3SiC_3H_6OCCH{=}CH_2$ (C=O) |
| amino | N(β-aminoethyl)-γ-aminopropyl methyl dimethoxy silane | $(CH_3O)_2Si(CH_3)C_3H_6NHC_2H_4NH_2$ |
| | N-(β-aminoethyl)-β-aminopropyl trimethoxy silane<br>N-(β-aminoethyl)-β-aminopropyl triethoxy silane<br>3-aminopropyl trimethoxy silane<br>3-aminopropyl triethoxy silane | $(CH_3O)_3SiC_3H_6NHC_2H_4NH_2$<br>$(C_2H_5O)_3SiC_3H_6NHC_2H_4NH_2$<br>$(CH_3O)_3SiC_3H_6NH_2$<br>$(C_2H_5O)_3SiC_3H_6NH_2$ |
| | 3-ethoxy silicon-N-(1.3-dimethyl-buteny) propylamino | $(C_2H_5O)_3SiC_3H_6N{=}C(C_4H_9)(CH_3)$ |
| | N-phenyl-3-propylamino trimethoxy silane | $(CH_3O)_3SiC_2H_6NH{-}C_6H_5$ |
| | N-(Vinylbenzyl)-2-ethylamino-3-propylamino trimethoxy silane hydrochloride | methanol solution, activity composition: 40% |
| ureido | 3-(ureido)propyl triethoxy silane | methanol solution, activity composition: 40%<br>$(C_2H_5O)_3SiC_3H_6NHCONH_2$ |
| propylchloride | 3-propylchloride trimethoxy silane | $(CH_3O)_3SiC_3H_6Cl$ |
| sulfur bases | 3-(sulfur)propyl methyl dimethoxy silane | $(CH_3O)_2Si(CH_3)C_3H_6SH$ |
| sulfur | 3-(sulfur)-propyl trimethoxy silane<br>di-[(triethoxy silane)propyl]tetra-sulfide | $(CH_3O)_3SiC_3H_6SH$<br>$(C_2H_5O)_3SiC_3H_6S_4C_3H_6Si(OC_2H_5)_3$ |
| isocyanate | 3-isocyanate propyl triethoxy silane | $(C_2H_5O)_3SiC_3H_6N{=}C{=}O$ |

The polysiloxane having the reactive functional groups is combination of one or more chemical compounds, which is selected from the group consisting of hydroxyl alkyl polysiloxane, carboxylic polysiloxane, dimethyl siloxane or ring methyl siloxane derivatives and modification, polysiloxane polyether copolymer, polysiloxane containing ethylene or epoxy group, polydimethylsiloxane (PDMS), polyacrylamide methyl siloxane (PPMS), poly-n-octyl-methyl siloxane (POMS), and poly phenyl methyl siloxane (PPhMS).

Recently, the researches regarding functional organic polysiloxane mostly are started from synthesizing macromolecules. The organic polysiloxane is synthesized by anionic ring-opening polymerization method or condensation polymerization and using functional groups or organosilicon monomer containing special structure, wherein the organic polysiloxane has a specialized function and a controlling structure.

It is known that the polysiloxane has advantages of both organic and non-organic materials, such as good thermal stability, low glass state temperature, high permeability, excellent dielectric properties, with good biocompatibility and the special surface properties. However, the weakness of the intermolecular force limits the applications of the polysiloxane for being used as a special material due to the poor mechanical properties. The active functional groups are implemented to the siloxane fragments as a side group or terminal group to form an active polysiloxane. The active polysiloxane is further formed with other polymers to form the polysiloxane fragments or graft copolymer, so that the mechanical properties of the polysiloxane are improved, so as to bring the advantages to another polymer.

The soil particle has the characteristics of high surface tension, hydrophilic, and easily aggregation, so that the soil particles are hard to evenly distributed in the high polar molecules or weaker polar force molecules, which is another limitation of being applied in polymer. Therefore, the surface of soil particle needs to be modified for being able to widely apply in polymer. Using the polysiloxane to envelope the surface of the soil particle with organics can enhance the compatibility and combining ability of the soil and the polymer, so as to enhance the physical properties of the polymer and reduce the manufacturing cost. The present invention adapts silane coupling agent for modifying normal soil. To compare with the non-modified soil, the composite material of the modified soil added with the coupling agent has a relatively greater hardness, yield strength, and tear strength, so as to decrease any external force to crack of the modified soil. The silane coupling agent organises the normal soil surface and improves the dispersion ability of the soil.

The emulsifier of organosilicon one of fatty acid amide alkyl silanes and fatty acid amide alkyl trialkoxysilane, wherein the fatty acid amide alkyl silanes is formed from a condensation reaction of a carboxylic acid and amino replacing silane.

The surfactant of present invention is able to physically and chemically react with the surface of the soil to form a hydrogen bond, and to become a covalent bond. The hydrogen bond and covalent force is an interfacial force which is greater than van der waals force. In addition, the total interfacial bonding energy between the surfactant and the soil is higher than the mono purity physical absorption. Therefore, the surfactant of the present invention has a high absorption force to the soil. The SiOH of the silane molecules is mutually condensate to copolymerize and form a net structure membrane to cover the surfaces of the soil particles and expose the R functional group thereat. The active functional group is able to bond with organic polymer material to form a strong crosslink between the soil and the organic polymer, so as to form a strong chemical bonding.

The method of present invention for modifying the surface of the soil particle is described as below.

Ingredients: 15 to 50% of surfactant and 50 to 80% of soil.

The manufacturing process of soil: the soil may be the yellow clay, red clay, black clay, or white clay etc. The soil is dried, pulverized, and sieved by 100 to 800 meshes for removing the stone, gravel, and debris, so that soil powder is obtained. Or the soil is mixed with water, sieved by 100 to 800 meshes to obtain a predetermined amount of mud, wherein the mud is then dried and pulverized to obtain the soil powder.

The soil modifying method: to modify the surface of the soil particle according to the properties of the surface of the soil particle. The first step is kinetic heating the soil powders to a predetermined temperature (80 to 130° C.). The second step is adding a surfactant into the soil powders at a dynamic status thereof for surface modification of the soil powders, preferably the surfactant is adding into the soil powders by atomization method. During the reaction between the surfactant and the soil powders at a dynamic status thereof, the reaction temperature is preferably maintained under 100° C. for 2 to 6 minutes. The activation of the soil particle surface is depending on the reaction time.

The crosslink between the soil particles and the organic polymer material is improved, and the dispersion is enhanced. The effective cross-section to withstand external loads has been increased, so as to increase the mechanical properties and functions of the organic polymer material. The modified soil is able to be widely applied for plastic, rubber, paint etc. The modified soil in the present invention is preferably applied on making composite elastomer material.

The present invention can be used for elastomer sports flooring (such as the flooring materials of track field, basketball court, volleyball court, tennis courts, table tennis court, swimming pool and playground), elastomer wall and floor bricks, synthesized leather etc. Some of the elastomer materials are added polyurethane, polyethylene, PVC, synthetic rubber, nylon, epoxy resin and other materials, and some of the elastomer materials solved the shortages of emitting toxic gaseous during the rubber vulcanization process, and some of the elastomer materials solved the performance shortcomings of the existence of rubber and thermoplastic elastomer, and provide new applications. But current elastomer products are also still high in cost, unstable, easy blistering, degumming, and delamination, and can not be recycled. Therefore the application still is not wide enough.

The soil after modified is able to form the crosslink with water-soluble acrylic copolymer emulsions to form elongated net shaped structure copolymer, wherein its physical and chemical properties are very stable. The present invention uses the product manufactured by the modified soil and acrylic emulsion copolymer elastomer, such as elastomer sports flooring, elastomer wall and floor bricks, synthetic leather, etc., which may overcome the shortages of existing technologies, it is also low in cost and has excellent physical and chemical characteristics of stability and durability.

Below is descried the applications of elastomer products made from the modified soil.

The modified soil is further chemically reacting with an acrylic acid copolymer emulsion to form a composite elastomer material to enhance the strength and elasticity thereof. In addition, by adding the additives and controlling the molding temperature, the composite elastomer material can be further improved its functional index. The compositions of the composite elastomer material are shown as follows:

modified soil: 30 to 80% by weight;

acrylic acid copolymer emulsion: 20 to 70% by weight;

plasticizer: 0 to 8% by weight;

antifreezer: 0 to 10% by weight;

foaming agent: 0 to 12% by weight;

defoamer: 0 to 2% by weight;

colorants: 0 to 6% by weight; and water: 0 to 20% by weight.

The acrylic acid copolymer emulsion is selected from at least one or more chemical compounds of (1) methyl acrylate (MA); (2) ethyl acrylate (EA); (3) butyl acrylate (n-BA); (4) acrylic acid-2-ethyl-hexyl (2-EHA); (5) Synthesis of styrene-butadiene latex and natural polymer materials mixed emulsion, (6) acrylic ester copolymer emulsion polymer; (7) polypropylene acid ethyl ester, acrylic acid, butyl hydroxymethyl acrylamide copolymer; (8) cross-linked acrylic ester copolymer emulsion (the non-reacted monomer containing equal to or less than one percentage); (9) anion, nonionic mixed self-crosslinking acrylic copolymer emulsion (the non-reacted monomer containing equal to or less than 0.5%); (10) emulsion copolymer of multi-acrylate having reactive functional group; (11) composite acrylic emulsion system copolymer, which has the following structure:

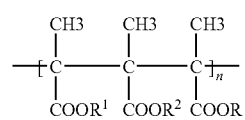

(12) methyl methacrylate, butyl acrylate, acrylamide copolymer emulsion, which has the following chemical structure:

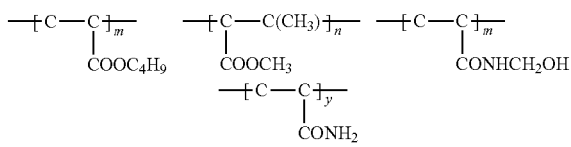

(13) methyl methacrylate, butyl acrylate, and acrylonitrile copolymer emulsion; (14) butyl acrylate and acrylonitrile copolymer; (15) copolymer emulsion of full acrylics; and (16) copolymer of acrylic acid and its ester which has the following structure:

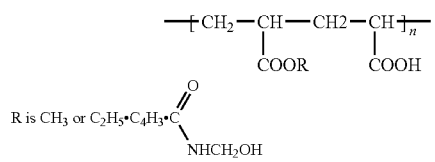

The acrylic acid copolymer emulsion of the present invention adapts the water-soluble emulsion in the market, wherein the solid-content requirement is between 30-50% by weight.

The plasticizer is one or more chemical compound mixture selected from the group consisting of emulsifier of organosilicon and aliphatic amine, organosilicon emulsion, polysiloxane having the reactive functional group, dicarboxylic acid amide derivatives, 18 alkyl ethylene urea, and quaternary ammonium anion surfactant.

The antifreezer is at least one of the ethylene amine or ethylene diamine (1,2-2 amino-ethane, a colorless, transparent viscous liquid), ethylene glycol and its derivatives, water-soluble amide, and calcium chloride.

The foaming agent is adapted for making the composite mud of the elastomer to produce tiny closed-pore structure. The foaming agent is at least one or more of chemical compounds selected form the group consisting of tosyl hydrazine, even ammonia dimethyl amide, azo-2 carbon amide (ADC), benzoyl peroxide (BPO), etc.

The defoamer used in the present invention is glycol polyoxyethylene polyoxypropylene ether (polymer-based surface-active agent), polyoxypropylene glycerol ether, which can effectively eliminate the foam during the paving or spraying process of the mud in order to enhance the density of the inner surface of final products, so as to eliminate the bubbles therewithin.

The colorants are water-based black, red, yellow, blue, and green painting element, or water-soluble inorganic pigments, such as carbon black, chromium titanium yellow, nickel chrome yellow, molybdenum chrome red, Sudan Red, Ultramarine Blue, zirconium, Co pigments and other series of inorganic pigments; or the organic pigments, such as azo pigments, phthalocyanine pigments, and heterocyclic pigment. The fine pigments of rutile titanium dioxide, phthalocyanine blue, and chrome yellow of high temperature resistant ability product has quality guarantee. Those pigments can also be widely used in paint, printing ink, plastic, rubber, synthetic leather, and other coloring areas.

The selection of foaming agent, antifreezer, defoamer, and colorants are set according to the products requirements. Some products required a relatively larger elastic characteristic, such as elastomer sports flooring, so that adding the foaming agent can enhance the elastomer of the products. For those outdoor products, a predetermined amount of the antifreezer may be added for enhancing the resistance of the relatively low temperature at −25° C. during the winter season. Some synthetic leathers need to add defoamer to enhance the durability of the products to be polished the surface thereof. The colorants are also being added in some products for enhancing the aesthetic appearance of the products.

The above soil being modified for making elastomer products is able to produce variety of products, such as elastomer sports flooring (including of elastomer paving material of the track field, basketball court, volleyball court, tennis courts, table tennis courts, swimming pools and playgrounds and other sports courts or fields), elastomer wall and floor bricks, and synthetic leather.

Some of the typical applications for use of the present invention are illustrated as followings.

The method for making an elastomer sports flooring from the modified soi 1 comprises the following steps.

(1) Mix the modified soil, the acrylic acid copolymer emulsion, the colorant, the plasticizer, the foaming agent, the cryoprotectants, and water in a mixing machine to form a composite mud.

(2) Pave the composite mud at a molding template, then bake the composite mud at the molding template at a constant temperature of 280° C. (±80° C.) to evaporate the water from the composite to form an elastomer sports flooring, and then remove the elastomer sports flooring from the molding template. The surface pattern of the elastomer sports flooring is controlled by the surface pattern of the molding template. The elastomer sports flooring can be used as indoor sports flooring or outdoor sports flooring, such as track field, basketball court, tennis courts, squash courts, badminton courts, table tennis courts, volleyball courts, and other playground as well as the floorings of the children safety playground, swimming pools, and other entertainment area.

The method for making the elastomer wall and floor bricks comprises the following steps.

(1) Mix the modified soil, the acrylic acid copolymer emulsion, the colorant, the plasticizer, the foaming agent, the cryoprotectants, and water via a mixing machine to form a composite mud.

(2) Pave the composite mud at a molding template, then bake the composite mud at the molding template at a constant temperature of 280° C. (80° C.) to evaporate the water from the composite to form an elastomer wall and floor brick, and then remove the elastomer wall and floor brick from the molding template. The surface pattern of the elastomer sports wall and floor brick, such as wood pattern, stone pattern, leather pattern, tile pattern, is controlled by the surface pattern of the molding template.

The method for making the composite soil leatherette comprises the following steps.

(1) Mix the modified soil, the acrylic acid copolymer emulsion, the colorant, the plasticizer, the foaming agent, the cryoprotectants, and water via a mixing machine to form a composite mud.

(2.1) For non fabric based composite soil leatherette: paving the composite mud on the molding template which has smooth surface or pattern thereon, wherein the thickness of the composite mud at the molding template is 0.15 mm to 3.0 mm; baking the composite mud at the molding template at a constant temperature between 80° C. and 285° C. until the composite mud is hardened, polishing the rear side of the hardened composite mud and remove it from molding template, and trimming the composite mud to form an non-lining fabric based composite soil leatherette.

(2.2) For fabric based composite soil skin: (2.2.1) paving the composite mud on the molding template which has smooth surface or pattern thereon, wherein the thickness of the composite mud at the molding template is 0.15 mm to 3.0 mm; baking the composite mud at the molding template at a constant temperature between 80° C. and 285° C. until the composite mud is hardened; trimming the edge of the composite mud; and attaching a base fabric on the composite mud; or (2.2.2) paving the composite mud on the lining fabric base, wherein the thickness of the composite mud has a thickness of 0.15 mm to 3.0 mm; baking the composite mud at a temperature of 80° C. to 285° C. until the composite mud its hardened, embossing patterns on the composite mud by a preheated or non-preheated embossing machine to form a desired pattern thereon.

Accordingly, the present invention has the following advantages.

The elastomer material of the elastomer track field made from the modified soil has a yield strength, fracture elongation, impact absorption, vertical deformation, and other performance indicators that fully meet the IAAF standard of track.

The composite elastomer of the sport stadium or court surface, swimming pool, and playground surface, which are made from the modified soil of the present invention, have the mechanical indexes that reach the German DIN standard.

The elastomer wall and floor brick made from the modified soil of the present invention has the characteristics of moisture-proof, anti-slip, not easy deformation, flame-retardant, smoothly touching, high durability, and low manufacturing cost.

The composite soil leatherette made from the modified soil of the present invention has excellent elasticity, anti-tearing, low cost, good ventilation, flame retardant, more durability, and anti-ultraviolet.

The composite elastomer products made from the modified soil of the present invention are relatively more eco friendly, since the added solvents in the process are water soluble, and no evaporation of organic solvent and emitting of toxic gaseous during the producing process.

The composite elastomer products made from the modified soil of the present invention uses the nature color of soil itself and adds small amount of painting paste of the color pigment to color the soil. Therefore, the color of the elastomer products is not easily changing the color under the strong ultraviolet for a long period.

The main raw material of the composite elastomer products made from the modified soil of the present invention is soil, which has a good water solubility and high specific density, so that the soil being paved outdoor has no arching phenomena after heavy rain.

The main raw materials of the composite elastomer products made from the modified soil of the present invention is soil and acrylic acid emulsion copolymer, so that the product will not generate the toxic and harmful gaseous and smelly odor, higher durability, easy to maintain, and recyclable.

The composite elastomer products made from the modified soil of the present invention is able to integrally formed one piece of the product, and uniformly quality from the bottom to the top of the product, so that the product will not result in delamination or particle pealing.

These and other objectives, features, and advantages of the present invention will become apparent from the following detailed description, the accompanying drawings, and the appended claims.

BRIEF DESCRIPTION OF THE DRAWINGS

As shown in FIG. 1, the method for modifying a surface of normal soil is to kinetically heat the soil powders such that at the dynamic status, the surfactant is added into the soil powders for surface modification of the soil powders when the soil powders are dried.

As shown in FIG. 2, the soil powers are reacted with acrylic acid copolymer emulsion and to plasticizer to be united together and to have stable physical and chemical properties, wherein grained soil powders are denoted as 1 and acrylic acid copolymer emulsion is denoted as 2.

DETAILED DESCRIPTION OF THE PREFERRED EMBODIMENT

Figure 1:
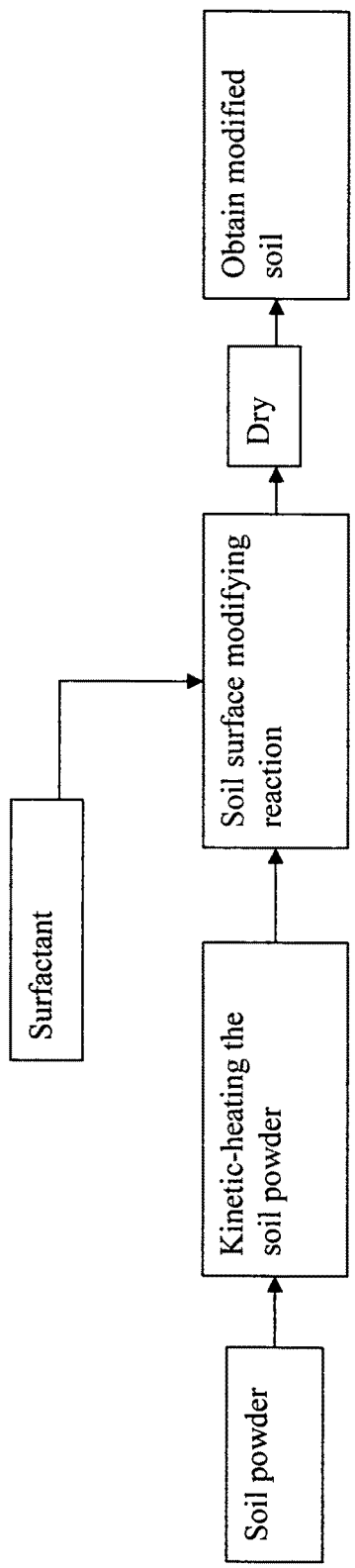
FIG. 1 is a block diagram of a method for modifying soil according to a preferred embodiment of the present invention.
Figure 2:
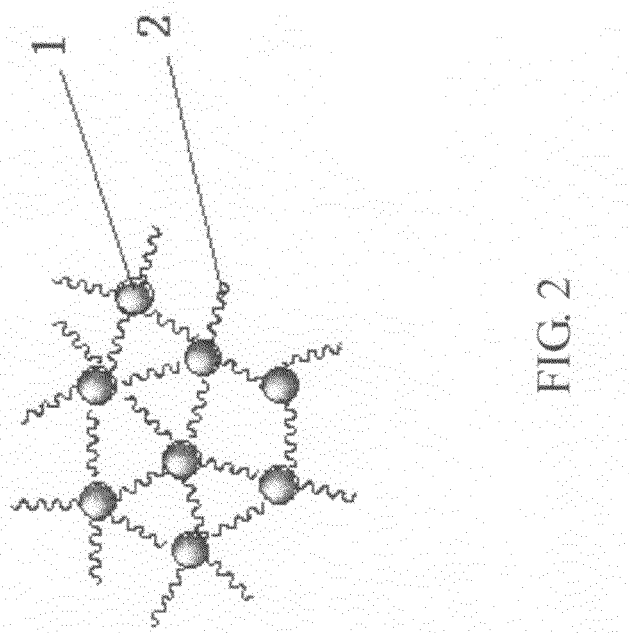
FIG. 2 is a chemical structure of a composite elastomer from the modified soil according to the preferred embodiment of the present invention.

One skilled in the art will understand that the embodiment of the present invention as shown in the drawings and described above is exemplary only and not intended to be limiting. Referring to FIGS. 1 to 2, a method for modifying a surface of soil and making an composite elastomer material by the modified soil of the present invention are illustrated and being specifically described in the following examples.

EXAMPLE 1

Obtain a predetermined amount of soil powder by collecting a predetermined amount of clean soil, preferably red clay; and drying, pulverizing, and sieving the red clay via 100 to 800 meshes to remove the rocky, gravels, and debris to obtain the soil powder. Alternatively, the soil powder can be obtained by mixing a predetermined amount of water with the soil; then sieving the mixed soil by 100 to 800 meshes to obtain a mud; and then drying and pulverizing the mud to obtain the soil powder. The surfactant used in this example is a silane coupling agent, which comprises vinyl trichlorosilane, polysiloxane having reactive functional group of a hydroxyl alkyl polysiloxane containing —$(CH_2)nOH$, fatty acid alkyl silane, and water. The weight ratio of vinyl trichlorosilane, polysiloxane, fatty acid alkyl silane, and water is 1:3:1:96, wherein the surfactant is obtained by mixing the above mixtures. The modified soil powder is manufactured by the following steps: kinetic heating the soil powders, preferably via a fluidized bed, at a temperature between 80 and 130° C.; adding the surfactant into soil powders, preferably by gas atomization, during the high speed dynamic status of the soil powders, wherein the weight ratio of soil powders and surfactant is 70:30; and keep heating the soil powders at the fluidized bed at a temperature between 80 to 130° C. for 2 to 6 minutes to obtain the modified soil powders.

EXAMPLE 2

Obtain a predetermined amount of soil powder by collecting a predetermined amount of clean soil, preferably yellow clay; and drying, pulverizing, and sieving the yellow clay via 100 to 800 meshes to remove the rocky, gravels, and debris to obtain the soil powder. Alternatively, the soil powder can be obtained by mixing a predetermined amount of water with the soil; then sieving the mixed soil by 100 to 800 meshes to obtain a mud; and then drying and pulverizing the mud to obtain the soil powder. The surfactant used in this example is a silane coupling agent, which comprises β-(3,4-epoxy cyclohexyl)ethyl-trimethoxysilane, polysiloxane having reactive functional group of a hydroxyl alkyl polysiloxane containing —(CH$_2$)$_3$OCH(OH)CH$_2$OH, fatty acid alkyl silane, and water. The weight ratio of β-(3,4-epoxy cyclohexyl)ethyl-trimethoxysilane, ethyl-trimethoxysilane, polysiloxane, fatty acid alkyl silane, and water is 2:5:0.5:92.5, wherein the surfactant is obtained by mixing the above mixtures. The modified soil powder is manufactured by the following steps: kinetic heating the soil powders, preferably via a fluidized bed, at a temperature between 80 and 130° C.; adding the surfactant into soil powders, preferably by gas atomization, during the high speed dynamic status of the soil powders, wherein the weight ratio of soil powders and surfactant is 80:20; and keep heating the soil powders at the fluidized bed at a temperature between 80 to 130° C. for 2 to 6 minutes to obtain the modified soil powders.

EXAMPLE 3

Obtain a predetermined amount of soil powder by collecting a predetermined amount of clean soil, preferably white clay to mix with a predetermined amount of water; sieving the mixed soil by 100 to 800 meshes to obtain a mud, and drying and pulverizing the mud to obtain the soil powder. Alternatively, the soil powder can be obtained by mixing a predetermined amount of water with the soil; then sieving the mixed soil by 100 to 800 meshes to obtain a mud; and then drying and pulverizing the mud to obtain the soil powder. The surfactant used in this example is a silane coupling agent, which comprises 3-(methacryloyl-oxy)propyl-trimethoxysilane, polysiloxane having reactive functional group of a Carboxyl group polysiloxane, fatty amido alkyl trialkoxysilane, and water. The weight ratio of 3-(methacryloyl-oxy)propyl-trimethoxysilane, polysiloxane, fatty amido alkyl trialkoxysilane, and water is 0.8:6:0.7:92.5, wherein the surfactant is obtained by mixing the above mixtures. The modified soil powder is manufactured by the following steps: kinetic heating the soil powders, preferably via a fluidized bed, at a temperature between 80 and 130° C.; adding the surfactant into soil powders, preferably by gas atomization, during the high speed dynamic status of the soil powders, wherein the weight ratio of soil powders and surfactant is 80:20; and keep heating the soil powders at the fluidized bed at a temperature between 80 to 130° C. for 2 to 6 minutes to obtain the modified soil powders.

EXAMPLE 4

Obtain a predetermined amount of soil powder by collecting a predetermined amount of clean soil, preferably white clay; and drying, pulverizing, and sieving the white clay via 100 to 800 meshes to remove the rocky, gravels, and debris to obtain the soil powder. Alternatively, the soil powder can be obtained by mixing a predetermined amount of water with the soil; then sieving the mixed soil by 100 to 800 meshes to obtain a mud; and then drying and pulverizing the mud to obtain the soil powder. The surfactant used in this example is a silane coupling agent, which comprises 3-(acryloyl oxy) propyl-trimethoxysilane, polysiloxane having reactive functional group of a Poly-n-octyl-methyl siloxane (POMS), fatty amido alkyl trialkoxysilane, and water. The weight ratio of 3-(acryloyl oxy)propyl-trimethoxysilane, polysiloxane, fatty amido alkyl trialkoxysilane, and water is 2.5:2:2:93.5, wherein the surfactant is obtained by mixing the above mixtures. The modified soil powder is manufactured by the following steps: kinetic heating the soil powders, preferably via a fluidized bed, at a temperature between 80 and 130° C.; adding the surfactant into soil powders, preferably by gas atomization, during the high speed dynamic status of the soil powders, wherein the weight ratio of soil powders and surfactant is 50:50; and keep heating the soil powders at the fluidized bed at a temperature between 80 to 130° C. for 2 to 6 minutes to obtain the modified soil powders.

EXAMPLE 5

Obtain a predetermined amount of soil powder by collecting a predetermined amount of clean soil, preferably black clay; and drying, pulverizing, and sieving the black clay via 100 to 800 meshes to remove the rocky, gravels, and debris to obtain the soil powder. Alternatively, the soil powder can be obtained by mixing a predetermined amount of water with the soil; then sieving the mixed soil by 100 to 800 meshes to obtain a mud; and then drying and pulverizing the mud to obtain the soil powder. The surfactant used in this example is a silane coupling agent, which comprises 3-aminopropionitrile trimethoxysilane, polysiloxane having reactive functional group of a Poly phenyl methyl siloxane (PPhMS), fatty amido alkyl trialkoxysilane, and water. The weight ratio of 3-aminopropionitrile trimethoxysilane, polysiloxane, fatty amido alkyl trialkoxysilane, and water is 1:7:1:91, wherein the surfactant is obtained by mixing the above mixtures. The modified soil powder is manufactured by the following steps: kinetic heating the soil powders, preferably via a fluidized bed, at a temperature between 80 and 130° C.; adding the surfactant into soil powders, preferably by gas atomization, during the high speed dynamic status of the soil powders, wherein the weight ratio of soil powders and surfactant is 75:25; and keep heating the soil powders at the fluidized bed at a temperature between 80 to 130° C. for 2 to 6 minutes to obtain the modified soil powders.

EXAMPLE 6

Obtain a predetermined amount of soil powder by collecting a predetermined amount of clean soil, preferably black clay; and drying, pulverizing, and sieving the black clay via 100 to 800 meshes to remove the rocky, gravels, and debris to obtain the soil powder. Alternatively, the soil powder can be obtained by mixing a predetermined amount of water with the soil; then sieving the mixed soil by 100 to 800 meshes to obtain a mud; and then drying and pulverizing the mud to obtain the soil powder. The surfactant used in this example is a silane coupling agent, which comprises 3-(acryloyl oxy) propyl-trimethoxysilane, fatty amido alkyl trialkoxysilane coupling agent, polydimethylsiloxane (PDMS), fatty amido alkyl trialkoxysilane, and water. The weight ratio of 3-(acryloyl oxy)propyl-trimethoxysilane, fatty amido alkyl trialkoxysilane coupling agent, polydimethylsiloxane (PDMS), fatty amido alkyl trialkoxysilane, and water is 1:5:4:1:89, wherein the surfactant is obtained by mixing the above mixtures. The modified soil powder is manufactured by the following steps: kinetic heating the soil powders, preferably via a fluidized bed, at a temperature between 80 and 100° C.; adding the surfactant into soil powders, preferably by gas atomization, during the high speed dynamic status of the soil powders, wherein the weight ratio of soil powders and surfactant is 70:30; and keep heating the soil powders at the fluidized bed at a temperature between 80 to 100° C. for 2 to 6 minutes to obtain the modified soil powders.

EXAMPLE 7

According to examples 1 to 6, the modified soil powders, made by yellow clay, are well-mixed with acrylate copolymer emulsion via a mixing machine to form a composite mud, wherein the weight ratio (%) of modified soil powders and acrylate copolymer emulsion is 56:44. The composite mud is paved to a template molding having a sheepskin pattern or crocodile skin pattern, wherein the thickness of the composite mud at the template molding is preferably 2 mm. The composite mud is baked at 280° C. (±80° C.). After the composite mud is dried, the composite mud is removed from the template molding to obtain an elastomer wall and floor brick product which has the sheepskin pattern or crocodile skin pattern thereon. A predetermined color of paste or toner can be added into the composite mud with the same method as mentioned above can obtain the variety of colors of elastomer wall and floor brick products. The thickness of elastomer wall and floor brick product can be selectively adjusted during the composite mud is paved at the template molding. The patterns of the elastomer wall and floor brick product can be selected by using different patterns of the template moldings.

EXAMPLE 8

According to examples 1 to 6, the modified soil powders, made by white clay, are well-mixed with copolymerization of poly-ethyl acrylate, poly-butyl acrylate, hydroxymethyl acrylamide, ethyleneamine cryoprotectant, brown printing paste, and emulsifier of organosilicon and aliphatic amine, via a mixing machine, to form a composite mud. Accordingly, 50% of modified soil powders (from white clay), 42% of copolymerization of poly-ethyl acrylate, poly-butyl acrylate, and hydroxymethyl acrylamide, 4% of ethyleneamine cryoprotectant, 1% of brown printing paste, and 3% of emulsifier of organosilicon and aliphatic amine are well mixed to form the composite mud. The composite mud is paved to a template molding having a stone or wood texture pattern, wherein the thickness of the composite mud at the template molding is preferably 6 mm. The composite mud is baked at 280° C. (±80° C.). After the composite mud is dried, the composite mud is removed from the template molding to obtain a brown colored elastomer wall and floor brick product which has the stone or wood texture pattern thereon. A predetermined color of paste or toner can be added into the composite mud with the same method as mentioned above can obtain the variety of colors of elastomer wall and floor brick products. The thickness of elastomer wall and floor brick product can be selectively adjusted during the composite mud is paved at the template molding. The patterns of the elastomer wall and floor brick product can be selected by using different patterns of the template moldings.

EXAMPLE 9

According to examples 1 to 6, the modified soil powders, made by yellow clay, are well-mixed with copolymerization of butyl acrylate (n-BA) and acrylic acid-2-ethyl hexyl(octyl acrylate, 2-EHA), ethyleneamine cryoprotectants, and plasticizer of polysiloxane having reactive functional group, via a mixing machine, to form a composite mud. Accordingly, 47% of modified soil powders (from yellow clay), 46% of copolymerization of butyl acrylate (n-BA) and acrylic acid-2-ethyl hexyl(octyl acrylate, 2-EHA), 3% of ethyleneamine cryoprotectants, and 4% of plasticizer of polysiloxane are well mixed to form the composite mud. The composite mud is paved to a template molding having a stone or wood texture pattern, wherein the thickness of the composite mud at the template molding is preferably 5 mm. The composite mud is baked at 280° C. (±80° C.). After the composite mud is dried, the composite mud is removed from the template molding to obtain a yellow colored elastomer wall and floor brick product which has the stone or wood texture pattern thereon. A predetermined color of paste or toner can be added into the composite mud with the same method as mentioned above can obtain the variety of colors of elastomer wall and floor brick products. The thickness of elastomer wall and floor brick product can be selectively adjusted during the composite mud is paved at the template molding. The patterns of the elastomer wall and floor brick product can be selected by using different patterns of the template moldings.

EXAMPLE 10

According to examples 1 to 6, the modified soil powders, made by yellow clay, are well-mixed with acrylate copolymer emulsion and water, via a mixing machine, to form a composite mud. Accordingly, 71% of modified soil powders (from yellow clay), 20% of acrylate copolymer emulsion, and 9% of water are well mixed to form the composite mud. The composite mud is paved to a template molding having a stone or wood texture pattern, wherein the thickness of the composite mud at the template molding is preferably 1.6 mm. The composite mud is baked at 280° C. (±80° C.). After the composite mud is dried, the composite mud is removed from the template molding to obtain a 1.6 mm yellow colored elastomer wall and floor brick product which has the stone or wood texture pattern thereon. A predetermined color of paste or toner can be added into the composite mud with the same method as mentioned above can obtain the variety of colors of elastomer wall and floor brick products. The thickness of elastomer wall and floor brick product can be selectively adjusted during the composite mud is paved at the template molding. The patterns of the elastomer wall and floor brick product can be selected by using different patterns of the template moldings.

EXAMPLE 11

According to examples 1 to 6, the modified soil powders, made by white clay, are well-mixed with self-cross-linked acrylate copolymer emulsion (unreacted monomer $\leqq 1\%$), via a mixing machine, to form a white colored composite mud. Accordingly, 50% of modified soil powders (from white clay), and 50% of self-cross-linked acrylate copolymer emulsion are well mixed to form the composite mud. The composite mud is paved to a template molding having a predetermined texture pattern, wherein the thickness of the composite mud at the template molding is preferably 8 mm. The composite mud is baked at 280° C. (±80° C.). After the composite mud is dried, the composite mud is removed from the template molding to obtain a 8 mm white colored elastomer wall and floor brick product which has the texture pattern thereon. A predetermined color of paste or toner can be added into the composite mud with the same method as mentioned above can obtain the variety of colors of elastomer wall and floor brick products. The thickness of elastomer wall and floor brick product can be selectively adjusted during the composite mud is paved at the template molding. The patterns of the elastomer wall and floor brick product can be selected by using different patterns of the template moldings.

EXAMPLE 12

According to examples 1 to 6, the modified soil powders, made by black clay, are well-mixed with composite of polyacrylate, via a mixing machine, to form a black colored composite mud. Accordingly, 35% of modified soil powders (from black clay), and 65% of composite of poly-acrylate are well mixed to form the composite mud. The composite mud is paved to a template molding having a predetermined texture pattern, wherein the thickness of the composite mud at the template molding is preferably 2 mm. The composite mud is baked at 280° C. (±80° C.). After the composite mud is dried, the composite mud is removed from the template molding to obtain a 2 mm black colored elastomer wall and floor brick product which has the texture pattern thereon. A predetermined color of paste or toner can be added into the composite mud with the same method as mentioned above can obtain the variety of colors of elastomer wall and floor brick products. The thickness of elastomer wall and floor brick product can be selectively adjusted during the composite mud is paved at the template molding. The patterns of the elastomer wall and floor brick product can be selected by using different patterns of the template moldings.

EXAMPLE 13

According to examples 1 to 6, the modified soil powders, made by yellow clay, are well-mixed with acrylate copolymer of composite emulsion and cryoprotectants of ethylene amines (ethylene amine), via a mixing machine, to form a yellow colored composite mud. Accordingly, 35% of modified soil powders (from yellow clay), 60% of acrylate copolymer of composite emulsion, and 5% of cryoprotectants of ethylene amines (ethylene amine) are well mixed to form the composite mud. The composite mud is paved to a template molding having a concave-convex pattern thereon pattern, with 1.22 m width and 22 m long, wherein the thickness of the composite mud at the template molding is preferably 13 mm. The composite mud is baked at 280° C. (±80° C.). After the composite mud is dried, the composite mud is removed from the template molding to obtain a 1.22 m×22 m×13 mm yellow colored elastomer track floor which has the concave-convex pattern thereon. A predetermined color of paste or toner can be added into the composite mud with the same method as mentioned above can obtain the variety of colors of elastomer track floor. The thickness of elastomer track floor can be selectively adjusted during the composite mud is paved at the template molding. The patterns of the elastomer track floor can be selected by using different patterns of the template moldings.

EXAMPLE 14

According to examples 1 to 6, the modified soil powders, made by red clay, are well-mixed with acrylate emulsion copolymer with reactive functional group, red printing paste, ethyleneamine cryoprotectants, and plasticizer of polysiloxane having reactive functional group, via a mixing machine, to form a red colored composite mud. Accordingly, 54% of modified soil powders (from red clay), 35% of acrylate emulsion copolymer with reactive functional group, 2% of red printing paste, 3% of ethyleneamine cryoprotectants, and 6% of plasticizer of polysiloxane having reactive functional group are well mixed to form the composite mud. The composite mud is paved to a template molding having a concave-convex pattern thereon pattern, with 2.44 m width and 12 m to long, wherein the thickness of the composite mud at the template molding is preferably 13 mm. The composite mud is baked at 280° C. (±80° C.). After the composite mud is dried, the composite mud is removed from the template molding to obtain a 2.44 m×12 m×13 mm red colored elastomer track floor which has the concave-convex pattern thereon. A predetermined color of paste or toner can be added into the composite mud with the same method as mentioned above can obtain the variety of colors of elastomer track floor. The thickness of elastomer track floor can be selectively adjusted during the composite mud is paved at the template molding. The patterns of the elastomer track floor can be selected by using different patterns of the template moldings.

EXAMPLE 15

According to examples 1 to 6, the modified soil powders, made by white clay, are well-mixed with mixed emulsion of synthesized (SBR emulsion) and natural polymer compound, blue or ultramarine printing paste, cryoprotectants of ethylene glycol and its derivatives, and plasticizer of dicarboxylic acid amide derivatives to form a white colored composite mud. Accordingly, 38% of modified soil powders (from white clay), 56% of mixed emulsion of synthesized (SBR emulsion) and natural polymer compound, 1% of blue or ultramarine printing paste, 4% of cryoprotectants of ethylene glycol and its derivatives, and 1% of plasticizer of dicarboxylic acid amide derivatives are well mixed to form the composite mud. The composite mud is paved to a template molding having a concave-convex pattern thereon pattern, wherein the thickness of the composite mud at the template molding is preferably 16 mm. The composite mud is baked at 280° C. (±80° C.). After the composite mud is dried, the composite mud is removed from the template molding to obtain a 16 mm blue colored elastomer track floor which has the concave-convex pattern thereon. A predetermined color of paste or toner can be added into the composite mud with the same method as mentioned above can obtain the variety of colors of elastomer track floor. The thickness of elastomer track floor can be selectively adjusted during the composite mud is paved at the template molding. The patterns of the elastomer track floor can be selected by using different patterns of the template moldings.

EXAMPLE 16

According to examples 1 to 6, the modified soil powders, made by yellow clay, are well-mixed with acrylate copolymer emulsion, green printing paste, and plasticizer of polysiloxane having reactive functional group to form a green colored composite mud. Accordingly, 40% of modified soil powders (from yellow clay), 57% of acrylate copolymer emulsion, 1% of green printing paste, and 2% of plasticizer of polysiloxane having reactive functional group are well mixed to form the composite mud. The composite mud is paved to a template molding having a concave-convex pattern thereon pattern, wherein the thickness of the composite mud at the template molding is preferably 25 mm. The composite mud is baked at 280° C. (±80° C.). After the composite mud is dried, the composite mud is removed from the template molding to obtain a 25 mm green colored elastomer track floor which has the concave-convex pattern thereon. A predetermined color of paste or toner can be added into the composite mud with the same method as mentioned above can obtain the variety of colors of elastomer track floor. The thickness of elastomer track floor can be selectively adjusted during the composite mud is paved at the template molding. The patterns of the elastomer track floor can be selected by using different patterns of the template moldings.

EXAMPLE 17

According to examples 1 to 6, the modified soil powders, made by yellow clay, are well-mixed with acrylate copolymer emulsion, plasticizer of emulsifier of organosilicon and aliphatic amine, and a predetermined amount of water to form a yellow colored composite mud. Accordingly, 60% of modified soil powders (from yellow clay), 30% of acrylate copolymer emulsion, 4% of plasticizer of emulsifier of organosilicon and aliphatic amine, and 6% of water to form the composite mud. The composite mud is paved to a template molding having a smooth surface, with 2 m width and 30 m long, wherein the thickness of the composite mud at the template molding is preferably 8 mm. The composite mud is baked at 280° C. (±80° C.). After the composite mud is dried, the composite mud is removed from the template molding to obtain a 2 m×30 m×8 mm yellow colored elastomer sport court or field, or swimming pool surface material which has the smooth surface. A predetermined color of paste or toner can be added into the composite mud with the same method as mentioned above can obtain the variety of colors of elastomer sport court or field, or swimming pool surface material. The thickness of elastomer sport court or field, or swimming pool surface material can be selectively adjusted during the composite mud is paved at the template molding. The patterns of the elastomer sport court or field, or swimming pool surface material can be selected by using different patterns of the template moldings.

EXAMPLE 18

According to examples 1 to 6, the modified soil powders, made by yellow clay, are well-mixed with acrylate emulsion copolymer with reactive functional group, plasticizer of emulsifier of organosilicon and aliphatic amine, and cryoprotectants of ethylene glycol and its derivatives to form a yellow colored composite mud. Accordingly, 35% of modified soil powders (from yellow clay), 56% of acrylate emulsion copolymer with reactive functional group, 3% of plasticizer of emulsifier of organosilicon and aliphatic amine, and 6% of cryoprotectants of ethylene glycol and its derivatives are well mixed to form the composite mud. The composite mud is paved to a template molding having a wooden texture pattern, wherein the thickness of the composite mud at the template molding is preferably 8 mm. The composite mud is baked at 280° C. (±80° C.). After the composite mud is dried, the composite mud is removed from the template molding to obtain a 8 mm yellow colored elastomer sport court or field, or swimming pool surface material which has the wooden texture pattern thereon. A predetermined color of paste or toner can be added into the composite mud with the same method as mentioned above can obtain the variety of colors of elastomer sport court or field, or swimming pool surface material. The thickness of elastomer sport court or field, or swimming pool surface material can be selectively adjusted during the composite mud is paved at the template molding. The patterns of the elastomer sport court or field, or swimming pool surface material can be selected by using different patterns of the template moldings.

EXAMPLE 19

According to examples 1 to 6, the modified soil powders, made by white clay, are well-mixed with acrylate copolymer of composite emulsion, yellow printing paste, 1-to-1 portion mixture of dicarboxylic acid amide derivatives and 18 alkyl ethylene urea plasticizer, and cryoprotectants of ethylene glycol and its derivatives to form an off-white colored composite mud. Accordingly, 50% of modified soil powders (from white clay), 43.5% of acrylate copolymer of composite emulsion, 0.5% of yellow printing paste, 2% of the 1-to-1 portion mixture of dicarboxylic acid amide derivatives and 18 alkyl ethylene urea plasticizer, and 4% of cryoprotectants of ethylene glycol and its derivatives are well mixed to form the composite mud. The composite mud is paved to a template molding having a stone or wooden texture pattern thereon, wherein the thickness of the composite mud at the template molding is preferably 9 mm. The composite mud is baked at 280° C. (±80° C.). After the composite mud is dried, the composite mud is removed from the template molding to obtain a 9 mm off-white colored elastomer sport court or field, or swimming pool surface material which has the stone or wooden texture pattern thereon. A predetermined color of paste or toner can be added into the composite mud with the same method as mentioned above can obtain the variety of colors of elastomer sport court or field, or swimming pool surface material. The thickness of elastomer sport court or field, or swimming pool surface material can be selectively adjusted during the composite mud is paved at the template molding. The patterns of the elastomer sport court or field, or swimming pool surface material can be selected by using different patterns of the template moldings.

EXAMPLE 20

According to examples 1 to 6, the modified soil powders, made by black clay, are well-mixed with copolymerization emulsion of methyl acrylate (MA), ethyl acrylate (EA), butyl acrylate (n-BA), and acrylic acid-2-ethyl hexyl(octyl acrylate, 2-EHA), and plasticizer of emulsifier of organosilicon and aliphatic amine to form a black colored composite mud. Accordingly, 42% of modified soil powders (from black clay), 56% of copolymerization emulsion of methyl acrylate (MA), ethyl acrylate (EA), butyl acrylate (n-BA), and acrylic acid-2-ethyl hexyl(octyl acrylate, 2-EHA), and 2% of plasticizer of emulsifier of organosilicon and aliphatic amine to form the composite mud. The composite mud is paved to a template molding having a fabric or wooden texture pattern, wherein the thickness of the composite mud at the template molding is preferably 8 mm. The composite mud is baked at 280° C. (±80° C.). After the composite mud is dried, the composite mud is removed from the template molding to obtain a 8 mm black colored elastomer sport court or field, or swimming pool surface material which has the fabric or wooden texture pattern. A predetermined color of paste or toner can be added into the composite mud with the same method as mentioned above can obtain the variety of colors of elastomer sport court or field, or swimming pool surface material. The thickness of elastomer sport court or field, or swimming pool surface material can be selectively adjusted during the composite mud is paved at the template molding. The patterns of the elastomer sport court or field, or swimming pool surface material can be selected by using different patterns of the template moldings.

EXAMPLE 21

According to examples 1 to 6, the modified soil powders, made by yellow clay, are well-mixed with acrylate copolymer emulsion, a predetermined amount of water, polysiloxane plasticizer, alkyl ether phosphate defoamer, and ethylene gloycol and its derivatives to form a yellow colored composite mud. Accordingly, 47% of modified soil powders (from yellow clay), 42% of acrylate copolymer emulsion, 4.5% of water, 3% of polysiloxane plasticizer, 0.5% of alkyl ether phosphate defoamer, and 3% of ethylene glycol and its derivatives are well mixed to form the composite mud. The composite mud is paved to a template molding having a predetermined pattern or smooth surface, wherein the thickness of the composite mud at the template molding is preferably 1.4 mm. The composite mud is baked at 100° C. (±20° C.). After the composite mud is dried, the composite mud is removed from the template molding, and is trimmed the edge thereof to obtain non fabric yellow composite leather. The colors of the non fabric composite leather are selectable by adding different color soil and/or adding different pigments or printing paste into the composite mud via the same process as mentioned above.

EXAMPLE 22

According to examples 1 to 6, the modified soil powders, made by black clay, are well-mixed with anionic, nonionic mixed self-cross-linked acrylate copolymer emulsion, a predetermined amount of water, plasticizer of polysiloxane, defoamer of propylene glycol polyoxypropylene polyoxyethylene ether, and black printing paste to form a black colored composite mud. Accordingly, 44% of modified soil powders (from black clay), 45% of anionic, nonionic mixed self-crosslinked acrylate copolymer emulsion, 5% of water, 4% of plasticizer of polysiloxane, 1% of defoamer of propylene glycol polyoxypropylene polyoxyethylene ether, and 1% of black printing paste are well mixed to form the composite mud. The composite mud is paved to a template molding having a texture pattern or smooth surface, wherein the thickness of the composite mud at the template molding is preferably 2 mm. The composite mud is baked at 200° C. (±30° C.). After the composite mud is dried, the composite mud is removed from the template molding, and is trimmed the edge thereof to obtain non fabric black composite leather. The colors of the non fabric composite leather are selectable by adding different color soil and/or adding different pigments or printing paste into the composite mud via the same process as mentioned above.

EXAMPLE 23

According to examples 1 to 6, the modified soil powders, made by yellow clay, are well-mixed with acrylate emulsion copolymer with reactive functional group, plasticizer of dicarboxylic acid amide derivatives, defoamer of glycerine polyether, and brown printing paste to form a brown colored composite mud. Accordingly, 40% of modified soil powders (from yellow clay), 54% of acrylate emulsion copolymer with reactive functional group, 3% of plasticizer of dicarboxylic acid amide derivatives, 1% of defoamer of glycerine polyether, and 1% of brown printing paste are well mixed to form the composite mud. The composite mud is paved to a template molding having a fabric or wooden texture pattern, wherein the thickness of the composite mud at the template molding is preferably 2.3 mm. The composite mud is baked at 200° C. (±50° C.). After the composite mud is dried, the composite mud is removed from the template molding, and is trimmed the edge thereof to obtain non fabric brown composite leather. The colors of the non fabric composite leather are selectable by adding different color soil and/or adding different pigments or printing paste into the composite mud via the same process as mentioned above.

EXAMPLE 24

According to examples 1 to 6, the modified soil powders, made by white clay, are well-mixed with acrylate emulsion copolymer with reactive functional group, plasticizer of emulsifier of organosilicon and aliphatic amine C, defoamer of organosilicon, and blue printing paste to form a yellow colored composite mud. Accordingly, 38.5% of modified soil powders (from white clay), 59% of acrylate emulsion copolymer with reactive functional group, 1.4% of plasticizer of emulsifier of organosilicon and aliphatic amine C, 0.5% of defoamer of organosilicon, and 0.6% of blue printing paste are well mixed to form the composite mud. The composite mud is placed on a piece of cotton or fabric, wherein the thickness of the composite mud is preferably 0.15 mm. The composite mud is baked at 100° C. (±20° C.) until it forms a membrane. An embossing machine is pre-heated at 130° C. for press printing a predetermined pattern on the fabric based light blue composite leather. The colors of the fabric based composite leather are selectable by adding different color soil and/or adding different pigments or printing paste into the mud via the same process as mentioned above.

EXAMPLE 25

According to examples 1 to 6, the modified soil powders, made by red clay, are well-mixed with anionic, nonionic mixed self-cross-linked acrylate copolymer emulsion, plasticizer of polysiloxane, defoamer of alkyl ether phosphate, and red printing paste to form a red colored composite mud. Accordingly, 43% of modified soil powders (from red clay), 52% of anionic, nonionic mixed self-cross-linked acrylate copolymer emulsion, 3% of plasticizer of polysiloxane, 1% of defoamer of alkyl ether phosphate, and 1% of red printing paste are well mixed to form the composite mud. The composite mud is placed on a piece of cotton or fabric, wherein the thickness of the composite mud is preferably 0.2 mm. The composite mud is baked at 100° C. (±20° C.) until it forms a membrane. An embossing machine is pre-heated at 130° C. for press printing a predetermined pattern on the fabric based red composite leather. The colors of the fabric based composite leather are selectable by adding different color soil and/or adding different pigments or printing paste into the mud via the same process as mentioned above.

EXAMPLE 26

According to examples 1 to 6, the modified soil powders, made by white clay, are well-mixed with acrylate copolymer emulsion, a predetermined amount of water, plasticizer of dicarboxylic acid amide derivatives, defoamer of propylene glycol polyoxypropylene polyoxyethylene ether, and black printing paste to form a grayish black colored composite mud. Accordingly, 43% of modified soil powders (from white clay), 49% of acrylate copolymer emulsion, 4% of water, 2.8% of plasticizer of dicarboxylic acid amide derivatives, 0.6% of defoamer of propylene glycol polyoxypropylene polyoxyethylene ether, and 0.6% of black printing paste are well mixed to form the composite mud. The composite mud is placed on a piece of cotton or fabric, wherein the thickness of the composite mud is preferably 0.18 mm. The composite mud is baked at 150° C. (±20° C.) until it forms a membrane. An embossing machine is pre-heated at 130° C. for press printing a predetermined pattern on the fabric based grayish black composite leather. The colors of the fabric based composite leather are selectable by adding different color soil and/or adding different pigments or printing paste into the mud via the same process as mentioned above.

EXAMPLE 27

According to examples 1 to 6, the modified soil powders, made by white clay, are well-mixed with peracrylate copolymer emulsion, a predetermined amount of water, plasticizer of quaternary ammonium anion, defoamer of alkyl ether phosphate, and golden yellow printing paste to form a yellow colored composite mud. The composite mud is placed on a piece of cotton or fabric, wherein the thickness of the composite mud is preferably 0.28 mm. The composite mud is baked at 160° C. (±20° C.) until it forms a membrane. An embossing machine is pre-heated at 130° C. for press printing a predetermined pattern on the fabric based yellow composite leather. The colors of the fabric based composite leather are selectable by adding different color soil and/or adding different pigments or printing paste into the mud via the same process as mentioned above.

EXAMPLE 28

According to examples 1 to 6, the modified soil powders, made by white clay, are well-mixed with copolymerization of poly-ethyl acrylate, poly-butyl acrylate, a predetermined amount of water, plasticizer of quaternary ammonium anion, and defoamer of glycerine polyether to form a white colored composite mud. Accordingly, 53% of modified soil powders (from white clay), 33% of poly-ethyl acrylate, poly-butyl acrylate, 10% of water, 3% of plasticizer of quaternary ammonium anion, and 1% of defoamer of glycerine polyether are well mixed to form the composite mud. The composite mud is paved to a template molding having a texture pattern or smooth surface, wherein the thickness of the composite mud at the template molding is preferably 1 mm. The composite mud is baked at 180° C. (±50° C.) until it forms a membrane. The composite mud is covered by a fabric and is trimmed the edge thereof to obtain a fabric white composite leather. The colors of the fabric based composite leather are selectable by adding different color soil and/or adding different pigments or printing paste into the mud via the same process as mentioned above.

EXAMPLE 29

According to examples 1 to 6, the modified soil powders, made by red clay, are well-mixed with acrylate copolymer, water, plasticizer of quaternary ammonium anion, and defoamer of glycerine polyether to form a red colored composite mud. Accordingly, 43.5% of modified soil powders (from red clay), 50% of acrylate copolymer, 3% of water, 3% of plasticizer of quaternary ammonium anion, and 0.5% of defoamer of glycerine polyether are well mixed to form the composite mud. The composite mud is paved to a template molding having a texture pattern or smooth surface, wherein the thickness of the composite mud at the template molding is preferably 1 mm. The composite mud is baked at 180° C. (±50° C.) until it forms a membrane. The composite mud is covered by a fabric and is trimmed the edge thereof to obtain a fabric red composite leather. The colors of the fabric based composite leather are selectable by adding different color soil and/or adding different pigments or printing paste into the mud via the same process as mentioned above.

The tests of some of the products of the present invention performances are showing as below.

1. The elastomer wall and floor bricks from the examples 7 to 12 of the present invention are dried for 10 day as a sample for the test.

1) Water resistance (3 days) of the products is unchanged.

2) Salt resistance (3% NaOH, 7 days) of the products is unchanged.

3) Acid resistance (pH=4H$_2$SO$_4$, 7 days) of the products is unchanged.

4) Freezing resistance (under 10 cycles) of the products is unchanged.

5) Dust resistance (5 times reflection coefficient decreasing rate)<10%.

6) Artificial aging resistance (3000 h).

The elastomer wall and floor bricks of the examples 7 to 12 of the present invention are tested by conducting an acute oral toxicity test (LD$_{50}$). After the delivery of variety of doses of chemical compound of the elastomer wall and floor brick to a predetermined number of mice, the mice had no abnormal responses, the diet was normal, and no death of the mice under the experiment occurred. The female and male mice LD$_{50}$ experiment has the result of LD$_{50}$>28.5 g/kg BW, so that the sample for the toxicity test of the elastomer wall and floor brick is at non toxic level. The test results are shown in below table.

| dose | Number of animals | | Number of died animal | |
|---|---|---|---|---|
| (g/Kg BW) | Female | Male | Female | Male |
| 28.5 | 5 | 5 | 0 | 0 |
| 23.5 | 5 | 5 | 0 | 0 |
| 18.8 | 5 | 5 | 0 | 0 |
| 15.5 | 5 | 5 | 0 | 0 |
| 11.1 | 5 | 5 | 0 | 0 |
| 8.52 | 5 | 5 | 0 | 0 |
| 4.84 | 5 | 5 | 0 | 0 |

The elastomer wall and floor brick test results of the formaldehyde, the organic compounds of total volatile, and benzene are shown below table.

| Test Items | Unit | Results |
|---|---|---|
| Formaldehyde | mg/m$^3$ | 0.001-0.002 |
| TVOC | mg/m$^3$ | 0.065-0.095 |
| benzene | mg/m$^3$ | 0.004-0.006 |
| Toluene | mg/m$^3$ | 0.001-0.002 |
| Xylene | mg/m$^3$ | 0.001-0.004 |
| O-Xylene | mg/m$^3$ | <0.02 |
| Soluble Lead | mg/kg | <0.027 |
| Soluble Chromium | mg/kg | <0.226 |
| Soluble Cadmium | mg/kg | <0.005 |
| Soluble Mercury | mg/kg | <0.005 |

2. The composite elastomer sports flooring from the examples 13 to 16 of the present invention are tested under the standard procedures, wherein the test results are shown in below table.

| Test Items | Test methods | Index | Test values (23° C.) |
|---|---|---|---|
| Impact absorption % | IAAF | 35%-50% | 37%-45% |
| Vertical deformation (mm) | IAAF | 0.6-1.8 mm | 0.9-1.1 mm |
| Yield strength | IAAF | ≧0.5 MPa | ≧0.68 MPa |
| Elongation at break | IAAF | ≧40% | 200%-288% |
| Friction coefficient | IAAF | ≧47 BPN 20° C. | 48-52 BPN |
| Volatile Organic Compounds | ASTM D 5116 | California Standard | Passed |
| Critical radiation flux | ASTM E 648 | | 0.44-0.58 W/cm$^2$, I type |
| Optical smoke density value | ASTM E 662 | I level | <450, I level |

-continued

| Test Items | Test methods | Index | Test values (23° C.) |
|---|---|---|---|
| Shore Hardness A | ASTM D 2240 | | 53-64 |
| Stability of color | | | excellent |
| Chemical solvent resistance | | | good |
| UV resistance | | | excellent |

3. The composite elastomer surface materials of the sport court or swimming pool from the examples 17 to 20 of the present invention are tested under the standard procedures, wherein the test results are shown in below table.

| Test Items | | Test methods | Test results |
|---|---|---|---|
| Shore Hardness | (A) | ASTM D 2240 | 54-84 |
| Ball resiliency | (%) | DIN 18032-2 | ≧95 |
| Yield strength | (N) | DIN 53455 | 1,290 psi |
| Residual | (%) | DIN18032-2 | 6%-10% |
| Breaking elongation | (%) | DIN 53455 | 150%-280% |
| Impact absorption | (%) | DIN18032-2 | 35%-55% |
| Vertical deformation | (mm) | DIN18032-2 | 0.9 mm-2.41 mm |
| Friction coefficient | | DIN18032-2 | 0.43-0.60 |
| Level of flame retardancy | | DIN 51960 | I level |

4. The composite leathers from the examples 21 to 29 of the present invention have 88.7% of the average physical parameters of peeling strength, 38% of tensile strength, and 36.5% of elongation at break. The parameters are achieved the technique parameters of normal sheep leather.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for modifying soil, comprising the steps of:
(a) obtaining a predetermined amount of soil powder by drying a predetermined amount of soil, pulverizing said soil, and sieving said soil to remove gravel and impurities of said soil, or by mixing a predetermined amount of soil with water, sieving the mixture of soil and water to obtain a predetermined amount of mud, drying said mud, and pulverizing said dried mud to obtain said soil powders;
(b) kinetic heating said soil powders;
(c) adding a surfactant into said soil powders at a dynamic status thereof for surface modification of said soil powders; and
(d) drying said soil powders to obtain a predetermined amount of modified soil.

2. The method, as recited in claim 1, wherein said surfactant comprises 0.6 to 6 mass portions of coupling agent, 1 to 12 mass portions of polysiloxane having one or more reactive functional groups, 0 to 2 mass portions of emulsifier of organosilicon, and the rest is water.

3. The method, as recited in claim 2, wherein said coupling agent is silane coupling agent, wherein a molecular formula of said silane coupling agent is RsiXn, wherein Xn in said RsiXn is hydrolysis group.

4. The method, as recited in claim 2, wherein said polysiloxane having said reactive functional groups is at least one of chemical compounds selected from the group consisting of hydroxyl alkyl polysiloxane, carboxylic polysiloxane, dimethyl siloxane or ring methyl siloxane derivatives and modification, polysiloxane polyether copolymer, polysiloxane containing ethylene or epoxy group, polydimethylsiloxane, polyacrylamide methyl siloxane, poly-n-octyl-methyl siloxane, and poly phenyl methyl siloxane.

5. The method, as recited in claim 2, wherein said emulsifier of organosilicon is selected from the group consisting of fatty acid amide alkyl silanes, which is formed from a condensation reaction of a carboxylic acid and amino replacing silane, and fatty acid amide alkyl trialkoxysilane.

6. The method, as recited in claim 1, wherein said modified soil is further chemically reacting with an acrylic acid copolymer emulsion to form a composite elastomer material, wherein 30 to 80 portions by weight of modified soil and 20 to 70 portion by weight of acrylic acid copolymer emulsion are added for chemically forming said elastomer material, wherein 0 to 8 weight portions of plasticizer, 0 to 12 weight portions of foaming agent, 0 to 10 weight portions of cryoprotectants, 0 to 2 weight portions of defoamer, 0 to 6 weight portions of colorants, and 0 to 20 weight portion of water are further added during the process for forming said elastomer material for improving the performances of said elastomer material.

7. The method, as recited in claim 6, wherein said acrylic acid copolymer emulsion is at least one of chemical compounds selected from the group consisting of (1) methyl acrylate; (2) ethyl acrylate; (3) butyl acrylate; (4) acrylic acid-2-ethyl-hexyl; (5) Synthesis of styrene-butadiene latex and natural polymer materials mixed emulsion, (6) acrylic ester copolymer emulsion polymer; (7) polypropylene acid ethyl ester, acrylic acid, butyl hydroxymethyl acrylamide copolymer; (8) Since the cross-linked acrylic ester copolymer emulsion; (9) anionic, nonionic mixed self-crosslinking acrylic copolymer emulsion; (10) with reactive groups of the multi-acrylate copolymer emulsion; (11) composite acrylic emulsion system copolymer; (12) methyl methacrylate, butyl acrylate, acrylamide copolymer emulsion; (13) butyl acrylate and acrylonitrile copolymer emulsion; (14) full-acrylic ester copolymer complex emulsion; (15) acrylic acid ester copolymer and its polymers; and (16) of the Complex and polyacrylate.

8. The method, as recited in claim 6, wherein said plasticizer contains at least one of chemical compounds selected from the group consisting of emulsifier of organosilicon and aliphatic amine, organosilicon emulsion, polysiloxane having said reactive functional group, dicarboxylic acid amide derivatives, 18 alkyl ethylene urea, and quaternary ammonium anion surfactant.

9. The method, as recited in claim 6, which is used for making an elastomer sports flooring, comprising the steps of:
(1) mixing said modified soil, said acrylic acid copolymer emulsion, said colorant, said plasticizer, said foaming agent, said cryoprotectants, and water, via a mixing machine, to form a composite mud; and
(2) paving said composite mud at a molding template, and baking said composite at said molding template at a constant temperature of 280° C. (±80° C.) to evaporate the water to form an elastomer material, and then removing said elastomer sports flooring from said molding template, wherein color of said elastomer sports flooring is controlled by said colorants, wherein a pattern on a surface of said elastomer sports flooring is controlled by a surface pattern of said molding template.

10. The method, as recited in claim 6, which is used for making an elastomer wall and floor brick, comprising the steps of:
(1) mixing said modified soil, said acrylic acid copolymer emulsion, said colorant, said plasticizer, said foaming agent, said cryoprotectants, and water, via a mixing machine, to form a composite mud; and
(2) paving said composite mud on a molding template, then drying said composite mud on said molding template to form an elastomer material, and then removing said elastomer material to obtain said elastomer wall and floor brick.

11. The method, as recited in claim 6, which is used for making a composite leather material from said modified soil, wherein said steps for making said composite soil skin material comprises the steps of:
(1) mixing said modified soil, said acrylic acid copolymer emulsion, said colorant, said plasticizer, said foaming agent, said cryoprotectants, and water, via a mixing machine, to form a composite mud; and
(2) forming a non fabric based composite leather by paving said composite mud at a template molding which has a predetermined pattern or smooth surface, wherein a thickness of said composite mud at said template molding is 0.15 mm to 3.0 mm, wherein said composite mud is baked between 80° C. and 285° C. until said composite mud forms a membrane to have a substantially fixed shape, wherein said composite mud is then removed from said template molding and is trimmed the edge thereof, so as to obtain said non fabric based composite soil skin; or
(2) forming a fabric based composite soil skin by placing said composite mud at a template molding having a texture pattern or smooth surface thereon, wherein a thickness of said composite mud at said template molding is 0.15 mm to 3.0 mm, wherein said composite mud is baked between 80° C. and 285° C. until said composite mud forms a membrane, wherein a fabric is then overlapped on said composite mud and is trimmed the edge thereof, wherein an embossing machine is used for press printing a predetermined pattern on said composite mud.

* * * * *